United States Patent
Nakagawa (10) Patent No.: US 6,429,628 B2
(45) Date of Patent: Aug. 6, 2002

(54) VOLTAGE STEP DOWN TYPE DC-DC CONVERTER HAVING A COUPLED INDUCTOR

(75) Inventor: Shin Nakagawa, Kiyose (JP)

(73) Assignee: Fidelix Y.K., Tokyo (JP)

( * ) Notice: Subject to any disclaimer, the term of this patent is extended or adjusted under 35 U.S.C. 154(b) by 0 days.

(21) Appl. No.: 09/777,079

(22) Filed: Feb. 5, 2001

(30) Foreign Application Priority Data

| Feb. 7, 2000 | (JP) | 2000-069443 |
| Apr. 10, 2000 | (JP) | 2000-145736 |

(51) Int. Cl.[7] ............................................. G05F 1/613
(52) U.S. Cl. ..................................................... 323/224
(58) Field of Search ................................. 323/224, 225, 323/235, 238, 247, 259, 262; 363/16, 24, 25, 131

(56) References Cited

U.S. PATENT DOCUMENTS 4,245,286 A * 1/1981 Paulkovich et al. .......... 363/21
5,594,629 A * 1/1997 Steogerwald ............ 363/131 X
5,729,444 A * 3/1998 Perol ............................ 363/25

OTHER PUBLICATIONS

K. Harada et al.; "A Method of Surge Reduction in the Switching Regulator" Switching Converters and Magnetics, vol. 1, Proceeding of PESC 76; IEEE Power Electronics Specialist Conference; 1976; pp. 10–11 (No month).

* cited by examiner

Primary Examiner—Jessica Han
(74) Attorney, Agent, or Firm—Norris, McLaughlin & Marcus P.A.

(57) ABSTRACT

In the DC-DC converter according to the present invention, an intermediate tap is provided in the free-wheel inductor; the free-wheeling current goes out through the tap. The switch at the main switch side is driven by an N-channel FET (NPN transistor) and a pulse transformer, or the switch constitutes a P-channel FET (PNP transistor), so that the driving circuit at the rectifying side can be made simple. Further, the DC-DC converter includes loss-less snubber circuits or a soft switching circuit having a sub-switch in order to absorb and recover the surge energy from a leaked inductance, which is generated by the addition of the intermediate tap. Moreover, the driving circuit for the soft switching circuit is also simplified.

12 Claims, 8 Drawing Sheets

VOLTAGE STEP DOWN TYPE DC-DC CONVERTER HAVING A COUPLED INDUCTOR

BACKGROUND OF THE INVENTION

1) Field of the Invention

The present invention relates to a voltage step down type DC-DC converter having a coupled inductor, which is preferably used in case it is required that a voltage should be largely lowered, for instance, used for a power supply apparatus where a voltage of 1.6 V is obtained from a power source with a voltage of 20 V.

Such a voltage step down-type DC-DC buck converter is generally used for the MPU (Microprocessor Unit) in the recently developed personal computers. The MPU is driven with a low voltage, for instance 1.6 V, however it requires a large current. Particularly, for lap-top type personal computers, it is required to make the efficiency higher while keeping the above condition in order to make the operating time of the battery long and to reduce heat generation.

2) Related Art

Figure 1:
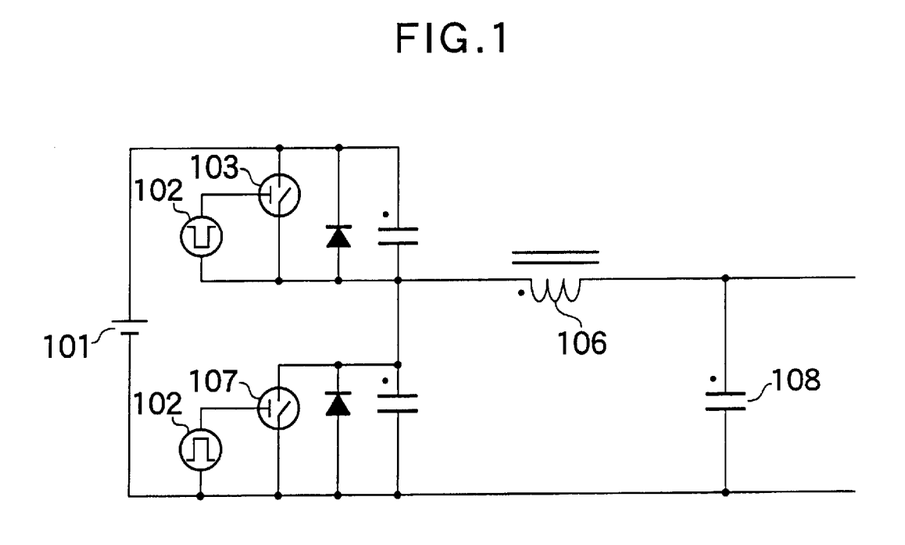
FIG. 1 is a circuit diagram depicting a conventional buck converter.

In the field of the power supply apparatus for personal computers where it is required to largely drop the voltage down, normal type buck converters have mainly been used. FIG. 1 is a circuit diagram showing a basic construction of the conventional buck converter. However, according to the conventional buck converters, when the voltage is greatly lowered, the duty ratio of a main switch becomes very small. Therefore, it becomes difficult to control the converter and the switching loss of the main switch becomes great. In order to solve this problem, it has begun common to use a voltage step down type converter where the voltage is decreased in two steps; an intermediate voltage is generated in a first step and a finally demanded low voltage is obtained in a second step. However, such a type of converter has problems in that the circuit thereof becomes complicated and also it is difficult to make the apparatus compact.

The present invention has for its purpose to provide a DC-DC converter, where the duty ratio of a main switch is made broader to make it easy to be controlled and a high efficiency can be realized by decreasing the switching loss of the main switch. According to the DC-DC converter of the invention, it is possible to largely lower the voltage, while the complexity caused in the conventional buck converter where the voltage is decreased in two steps is withdrawn, the size of the apparatus becomes compact, and the cost for manufacturing can be saved.

SUMMARY OF THE INVENTION

In order to realize the purpose, the DC-DC converter according to the present invention has a characteristic in that the DC-DC converter comprises a DC power supply, a main switch, a free-wheel inductor and a free-wheel switch, wherein an intermediate tap is provided in the free-wheel inductor, thereby a free-wheel current goes out through the intermediate tap. According to this construction, the duty ratio of the main switch becomes broader in comparison to the conventional buck converter that does not have a tap in the free-wheel inductor.

The DC-DC converter according to the present invention has an aspect in that an N-channel FET is used for the free-wheel switch, while a P-channel FET or a PNP transistor is used for the main switch. According to this aspect, the driving circuit for both the switches can be made simple.

The DC-DC converter according to the present invention has another aspect in that an N-channel FET or an NPN transistor is used for the main switch being combined with a pulse transformer. According to this aspect, the driving circuit for the main switch can also be made simple.

The DC-DC converter according to the present invention has still another aspect in that the DC-DC converter further comprises one or more loss-less snubber circuits, where a surge energy generated from a leakage inductance, due to the existence of the intermediate tap, is reused, so that an energy recovery is realized. The DC-DC converter may further comprise a sub-switch for conducting a soft switching operation. According to the present invention, the driving circuits for driving the main switch and the free-wheel switch, the active snubber circuit and the sub-switch for the soft-switching operation can be made simple.

The DC-DC converter according to the present invention has still another aspect in that in case a sufficiently high input voltage can be obtained, both the driving circuit for the main switch (high side) and the driving circuit for the free-wheel switch (low side) may be connected together in series, so that the power for driving can be saved.

Furthermore, the DC-DC converter according to the present invention has still another aspect in that the DC-DC converter has a construction where a sub-switch for ZVT (zero voltage transition) operation is added to the construction of a flyback converter so that each switching element there conducts a soft switching operation. Furthermore, one or more loss-less snubber circuits is added to the construction to realize a more preferable operation.

The DC-DC converter system according to the present invention has still another aspect in that two or more DC-DC converters having the characteristics mentioned above are connected together in parallel so that so-called interleave construction is realized, driving signals are driven in a multi-phase manner. According to this interleave construction, it is possible to reduce noise and/or ripples in the output of the converter.

BRIEF DESCRIPTION OF THE DRAWINGS

FIGS. 6(a) to 6(f) show operational waveforms of the DC-DC converter according to the present invention;

FIGS. 7(a) to 7(f) illustrate operational waveforms of the DC-DC converter according to the present invention.

FIGS. 9(a) to 9(f) illustrate operational waveforms for the embodiment of the two DC-DC converters shown in FIG. 8 according to the present invention;

DETAILED DESCRIPTION OF THE PREFERRED EMBODIMENTS

Figure 2:
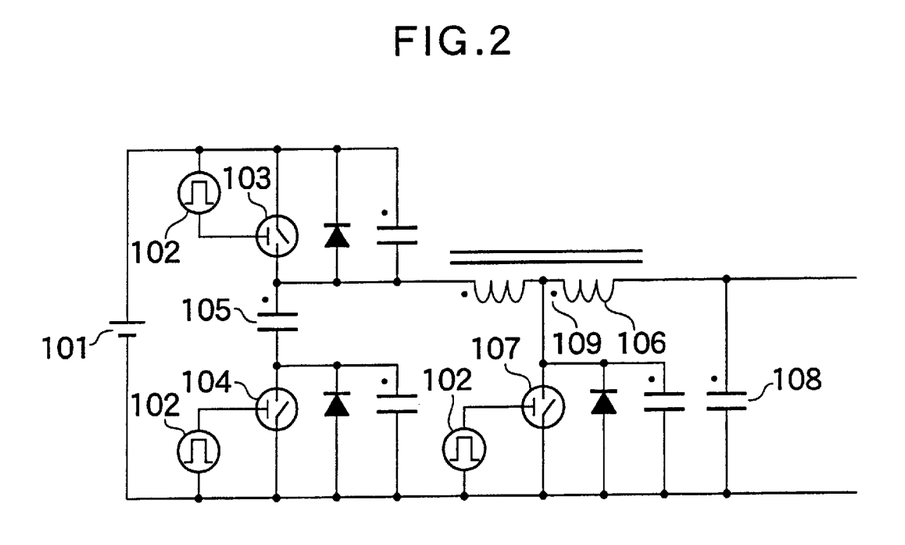
FIG. 2 is a circuit diagram showing a basic construction of the DC-DC converter according to the present invention.

FIG. 2 is a circuit diagram showing a first embodiment of a DC-DC converter according to the present invention. In FIG. 2, the numerical reference 101 represents a DC power supply. Three drive signals 102, 102, 102, which are supplied from a control circuit (not shown), are given to a main switch 103, a free-wheel switch 107 and a sub-switch 104, respectively, to control the operation of the switching elements, respectively. It should be noted that the operating circuits for stabilizing a voltage of the DC-DC converter is omitted here. In the first embodiment, a P-channel FET is used for the main switch 103, while an N-channel FET is used for the free-wheel switch 107; these switches 103 and 107 become ON alternatively. The numerical reference 106 is a free-wheel inductor, which has a tap 109; the reference 108 is a capacitor for making the output voltage smooth.

The sub-switch 104 is provided for conducting a soft switching operation and the numerical reference 105 denotes a capacitor for resonating. It should be noted that an N channel FET is used for the sub-switch 104. Diodes and capacitors, provided in parallel with the source and drain of each FET (103, 104, 107), are body diodes and capacitance between electrodes, respectively. It may be possible to provide another diode and capacitor outside of each switching element 103, 104, 107 in the same direction to that of the diodes 103a, 104a, 107a and in parallel with the switching element.

Figure 10:
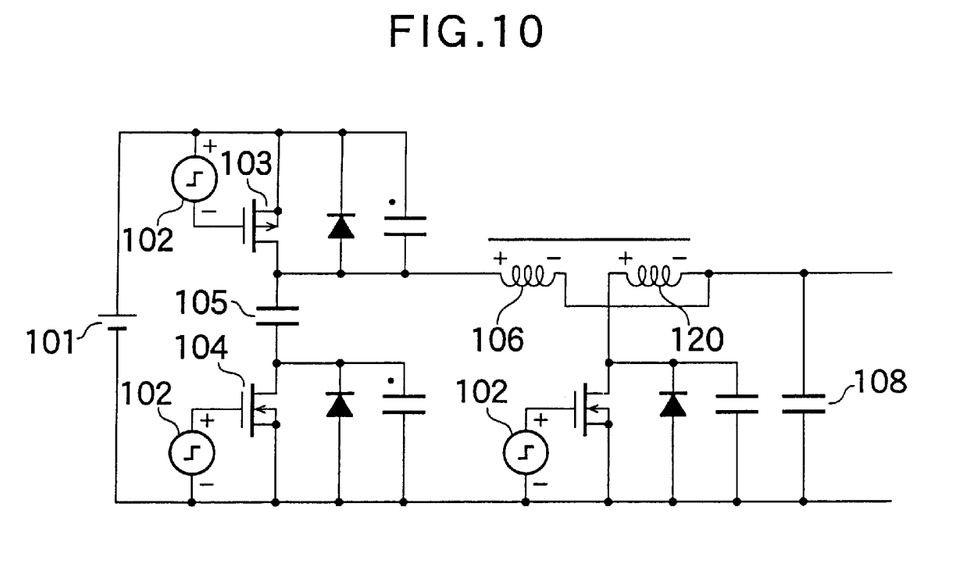
FIG. 10 is a circuit diagram illustrating a fourth embodiment according to the present invention.

The basic construction of the DC-DC converter according to the present invention, where the sub-switch 104 and the capacitor 105 for resonance are omitted from the circuit shown in FIG. 2, will be explained first. According to the basic construction, when the main switch 103 is turned ON, a magnetizing current coming through the main switch 103 energizes the inductor 106. Then the main switch 103 turns OFF and the free-wheel switch 107 turns ON, so that a free-wheel current goes out through the intermediate tap 109 of the inductor 106 toward the smoothing capacitor 108. Since a coupled inductor is used, in other words, since the intermediate tap 109 is provided in the inductor 106, the inductance, when the free-wheeling switch 107 is ON, becomes smaller than the inductance when the main switch is ON. Therefore, when the free-wheel switch 107 is ON, much more free-wheeling current goes through in a short time period. As a result, the duty ratio of the main switch 103 can be made wider. It should be noted that the position of the intermediate tap 109 is not limited to the center of the inductor 106 but an arbitrary point can be selected. Further, it may be possible to arrange the converter such that the free-wheel electric current goes through another coil 120 provided in the inductor 106, as shown in the circuit of FIG. 10.

In addition to the above-mentioned basic construction, a capacitor for resonating is connected to the main switch 103 in a parallel manner, which resonates to the leakage inductance generated by the existence of the coupled inductor 106. According to this construction, by arranging the ON-OFF timing of the switching elements such that the free-wheel switch 107 is ON; the main switch 103 is ON, the free wheel switch 107 is OFF and the main switch 103 is OFF, in this order, the main switch 103 operates as a zero voltage switch (ZVS) and the free-wheel switch 107 operates as a zero current switch (ZCS). FIGS. 6(a) to 6(f) show voltage waveforms when the main switch 103 turns OFF and current waveforms when the free-wheel switch 107 turns ON. As shown in FIGS. 6(a) to 6(f), these waveforms become a half waveform of a sign waveform. When a PFM control is conducted fixing the off time of the main switch 103, the DC-DC converter according to the above-mentioned construction operates in a preferred manner.

Figure 6A:
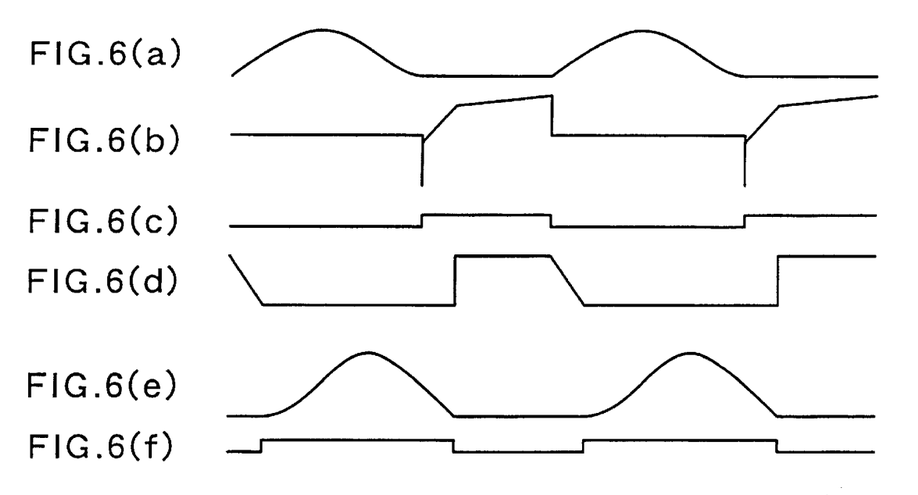

FIG. 6(a) shows a voltage waveform of the main switch 103, FIG. 6(b) a current waveform of the main switch 103, FIG. 6(c) a driving voltage waveform of the main switch 103, FIG. 6(d) a voltage waveform of the free-wheel switch 107, FIG. 6(e) a current waveform of the free-wheel switch 107, and FIG. 6(f) shows a driving voltage waveform of the free-wheel switch 107, respectively. According to the construction shown in FIG. 2, the capacitor for resonating is connected to the plus side of the DC power supply 101. However even if the capacitor is connected to the minus side, it still operates in a parallel manner with the main switch 103.

In the basic construction of the present invention mentioned above, when the capacitor for resonating is provided at the free-wheel switch 107 side in parallel to the switch 107 and the switching timing of the main switch 103 and the free-wheel switch 107 is arranged as mentioned above, the main switch 103 conducts the zero current switching operation and the free-wheel switch 107 conducts the zero voltage switching operation. In this case, when a PFM control is conducted fixing the ON time of the main switch 103, the DC-DC converter operates in a preferred manner.

In case that, an intermediate tap 109 is provided in the inductor 106, when the wheel switch 107 becomes ON, the voltage at the left side of the inductor 106 becomes minus. Therefore, if an N channel FET or an NPN transistor is used for the main switch 103, a minus power source is required in addition to a plus power source, which is basically required. In the case that an N-channel FET or an NPN transistor is used for the main switch, the driving circuit becomes complicated as mentioned above, however, by adding a pulse transformer to the N-channel FET or the NPN type transistor, a minus power supply is not required and it is possible to make the construction of the driving circuit for the main switch 103 simple.

On the other hand, if a P-channel FET is used (or a PNP transistor may be used) for the main switch 103, it is possible to make the driving circuit more simple. However, P-channel FETs generally have a large ON resistance, so that a loss of the main switch 103 becomes large due to the large ON resistance. According to the present invention, the root mean square current of the main switch 103 becomes so small due to the coupled construction of the inductor 106 that the loss of the main switch 103 caused by the ON resistance of the P-channel FET is not increased. Therefore, even if a P-channel FET or a PNP transistor is used for the main switch 103 in order to make the driving circuit thereof simple, a loss-less power supply apparatus can be realized.

In addition to this, since the voltage applied to the free-wheel switch 107 becomes small by the existence of the tap 109 of the inductor 106, a switching element having a low ON resistance can be selected for the free-wheel switch 107, so that the loss caused by the ON resistance of the free-wheel switch 107 can also be reduced.

In the converter where the intermediate tap 109 is provided in the free-wheel inductor 106, a leakage inductance is caused from the tap, so that a surge energy is generated at a moment when the main switch 103 turns OFF. According to the invention, the thus generated surge energy is reused by providing a loss-less snubber circuit(s), which will be explained below, or by arranging such that the switching elements conduct a soft switching operation. As shown in FIG. 2, the sub-switch 104 and the capacitor for resonating 105 constitute so-called active clamp construction, which is for conducting the soft switching operation. According to this construction, a ZVS operation by soft switching operation can be realized by making the main switch 103 and the sub-switch 104 alternatively ON with a little simultaneous overlapped OFF time. As a result, it is possible to realize the DC-DC converter having a high efficiency and to make the noise low. It should be noted that if an N-channel FET is used for the free-wheel switch 107, the driving circuit thereof becomes simple.

If the sub switch 104 for soft switching operation and the capacitor 105 for resonating are provided, the ON-OFF timing of the switching elements in the apparatus may not be in the best condition. However, this problem can be easily solved by adjusting the timing to make the free-wheel switch 107 ON or OFF.

In case that the input voltage is sufficiently high so that a voltage which is required to drive the switching elements can be obtained even if the input voltage is divided, it may be possible to connect the driving circuits for the main switch and the free-wheel switch together in a series manner. According to this arrangement, the power for driving the elements can be reduced.

Figure 8:
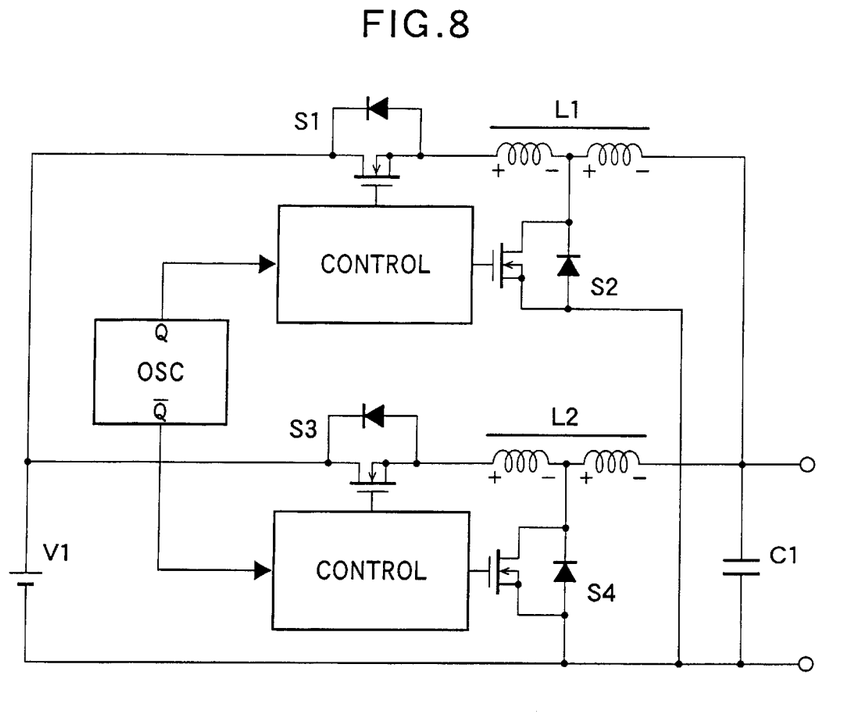
FIG. 8 is a circuit diagram showing two DC-DC converters connected together in parallel according to the present invention.
Figure 9A:
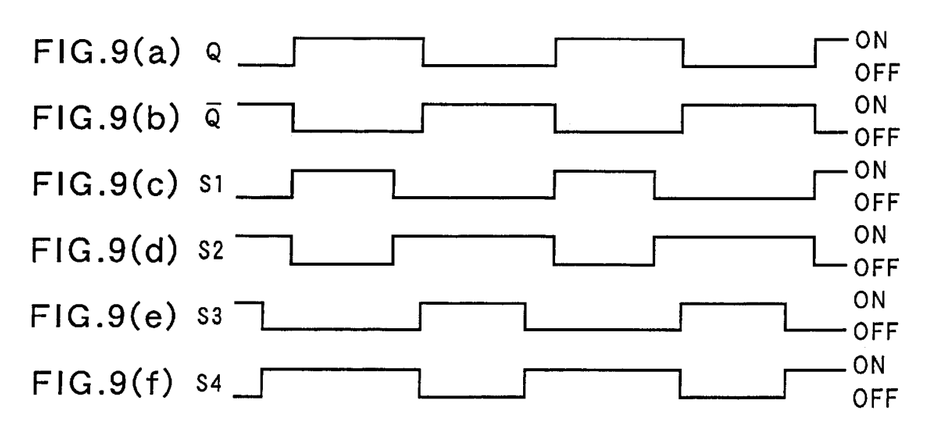

By using a coupled inductor 106, i.e., an inductor 106 with a tap 109, a step is caused between the current at the main switch 103 side and the free-wheeling current. Due to the current step, an output ripple current is increased. It is possible to reduce the ripple current by providing a smoothing capacitor having a small equivalent series register. However, in case it is required to make the ripple current caused by a switching operation extremely small, or in case it is required to make the size of the smoothing capacitor extremely small, it may be possible to connect two or more DC-DC converters according to the present invention in parallel, as shown in the circuit of FIG. 8 where S1 and S3 are main switches, S2 and S4 are free wheel switches, L1 and L2 are free-wheel inductors, and C1 is a smoothing capacitor, and drive the switching operation in these converters in a multiple phase, as shown in FIGS. 9(a) to 9(f), so that the ripple current can be cancelled. In this case, one or more servo controlling system can be provided. The method for conducting this arrangement is obvious for the skilled in the art, so the explanation therefor is omitted here.

Figure 3:
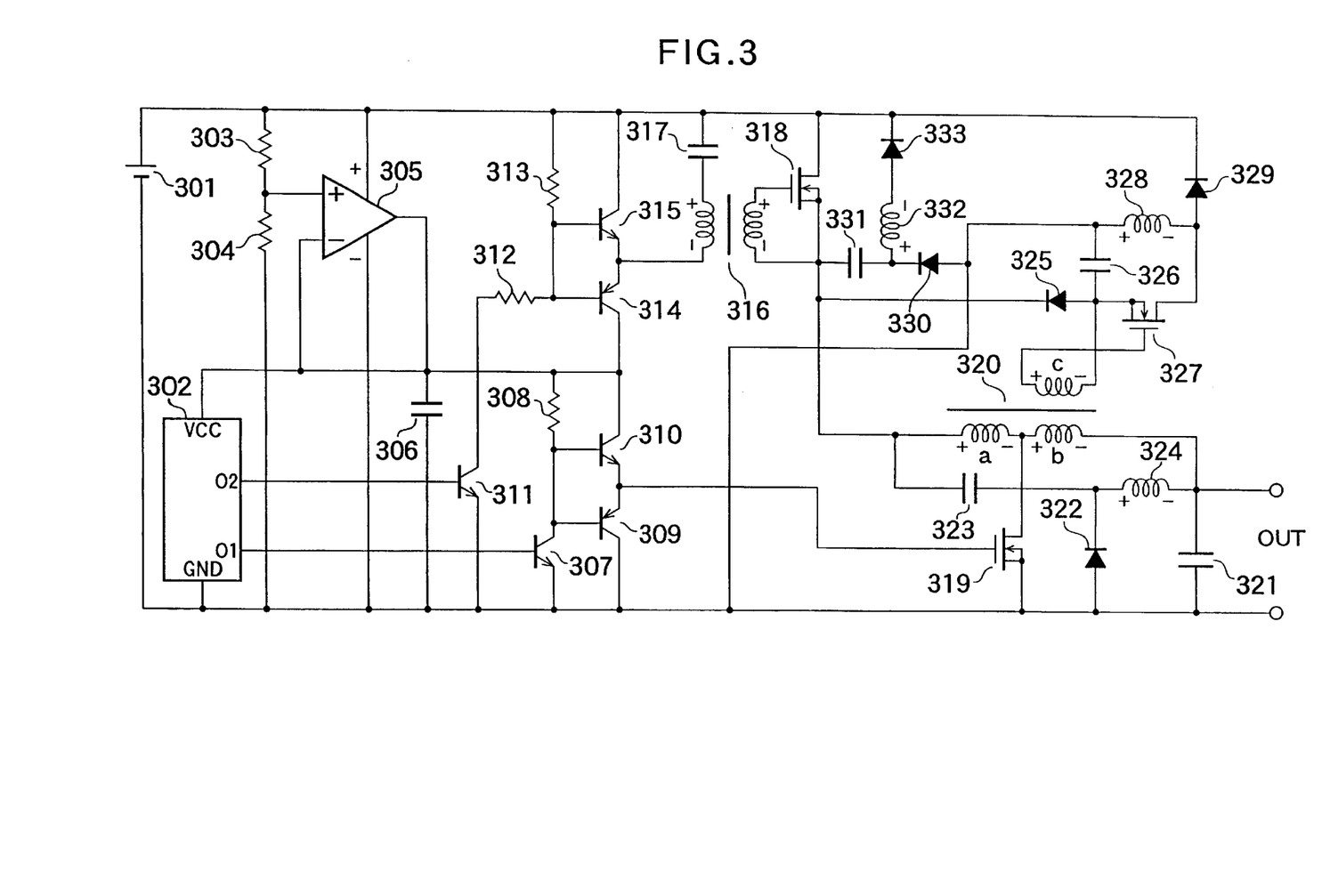
FIG. 3 is a circuit diagram illustrating a first embodiment according to the present invention.

The detail of the first embodiment of the present invention is illustrated in FIG. 3. The input power supply 301 is divided by the resisters 303 and 304 into almost one to two (½). The divided power is supplied to a center point of a high side driving circuit A and a low side driving circuit B, respectively, and supplied to a control circuit 302 via an operational amplifier 305; the high side driving circuit A and the low side driving circuit B are connected together in series as shown in FIG. 3. In such a manner, in case that a required voltage can be obtained even if the input voltage is divided, it is possible to reduce the driving power by dividing the input voltage. It should be noted a capacitor 306 is provided in order to make the voltage stable even if a pulse current is given. An emitter follower type amplifier can be used for the operational amplifier 305. It should be noted that the function for making the control circuit 302 stable is not explained here.

The output O1 of the control circuit 302 drives an N channel FET 319, i.e., a switching element at the free-wheel side, via the low side driver B being constituted of transistors 307, 309, 310 and a resister 308. The output O2 of the control circuit 302 drives an N-channel FET 318, i.e., a main switch 318, via the high side driver A being constituted of transistors 311, 314, 315 and resistors 312 and 313, and further via a pulse transformer 316 and a capacitor 317. The outputs O1 and O2 operate at almost simultaneous timing; since the pulse transformer 316 is, however, connected in the direction shown in FIG. 3, the switching elements 318 and 319 operate almost alternatively.

In the embodiment shown in FIG. 3, the free-wheel inductor 320 constitutes a transformer 320, which basically operates with coils a and b. However, in the first embodiment, the transformer 320 further comprises a coil c in addition to the coil a and b. The coil c serves to operate the below-mentioned second loss-less snubber circuits, i,e., an active snubber circuit. Loss-less snubber circuits will be explained below, which absorb and reuse a surge energy generated by the leakage inductance which is caused depending on the degree of coupling of the coils a and b.

The surge energy generated at the moment when the main switch 318 turns OFF, is stored in a capacitor 323 through a diode 322. Then, during when the main switch 318 is ON, the energy is recovered to the output through an inductor 324. This is a first loss-less snubber circuit. It may be possible to replace the inductor 324 by a resistance.

The surge energy generated at a moment when the main switch 318 turns OFF is also stored in a capacitor 326 via diode 325. Then at the time when the main switch 318 turns ON, a recovery switch 327 is driven by the soil c of the transformer 320 and then an inductor 328 is thereby magnetized. Then, the recovery switch 327 is turned OFF, and the surge energy is recovered to the input power supply through a diode 329 at this time. It may be possible to obtain the drive signal for the recovery switch 327 from another coil added to the pulse transformer 316. This is the second loss-less snubber circuit. It should be noted that in case that a resistor or a Zener diode is provided in parallel to the capacitor 326 to exchange the surge energy to a thermal energy thereby, the recovery switch 327, the inductor 328 and the diode 329 may be omitted.

The surge energy generated at a moment when the main switch 318 is turned OFF is further stored in a capacitor 331 through a diode 330. Then, at the time when the main switch 318 is turned OFF, the surge energy is recovered to the input power supply through the inductor 332 and the diode 333. This is the third loss-less snubber circuit.

The DC-DC converter according to the invention may have only one or two of the above mentioned snubber circuits, or all of them. All of the snubber circuits shown in FIG. 3 can be called loss-less snubber circuits.

Figure 4:
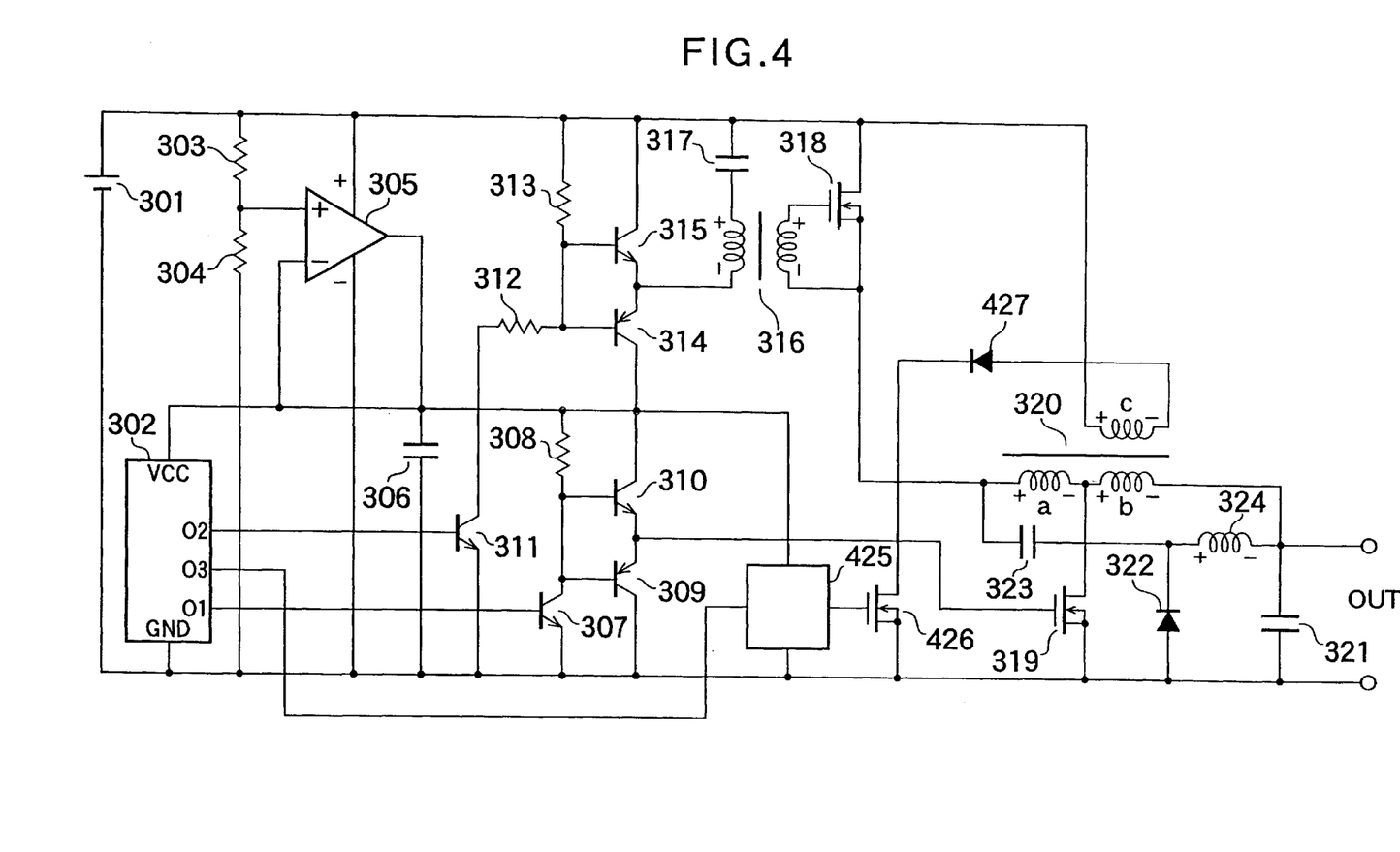
FIG. 4 is a circuit diagram representing a second embodiment according to the present invention.

FIG. 4 shows a second embodiment according to the invention, where a soft-switching technique, so-called ZVT (Zero Voltage Transition) is applied to the DC-DC converter of the present invention. It should be noted that the same reference numbers are used for the same components and the explanation therefor is omitted here.

The control circuit 302 comprises an additional output terminal O3; the output from the terminal O3 drives a sub switch for soft switching operation, i.e. an FET 426, through a driving circuit 425. The drain of the transistor 426 is connected to the input power supply 301 via a diode 427 and the coil c of the transformer 320. The connection of the drain of the sub-switch 426 and the input power supply 301 using the coil c is so designed that no high side driver or no pulse transformer is necessary in the driving circuit of the sub-switch 426. It should be noted that the coil c for the ZVT may be additionally provided from the connecting point of the main switch 318, and the sub-switch 426 may be arranged at the high side. In this case, the sub-switch 426 may be altered by the combination of a pulse transformer and an N-channel FET or a P-channel FET.

The operational timing of the switches 319,426 and 318 is as follows: the free-wheeling switch 319 is ON, the sub-switch 426 is ON, the free-wheel switch 319 is OFF, the main switch 318 is ON, the sub-switch 426 is OFF, the main switch 318 is OFF, in this order. It may be possible to add another diode, for instance, a Shottky barrier diode and/or another capacitor in parallel with the body diode of each switching element 318, 319, and 426. According to the invention, the leakage inductance existing in each coil of the transformer 320 is effectively used. However, it may be possible to add an external inductor. According to the ZVT mentioned above, the turn-on loss of the main switch 318 is effectively reduced, and the loss-less snubber circuit constituting the diode 322, the capacitor 323, and the inductor 324 effectively reduces the turn-off loss of the main switch 318. Therefore, all of the switching elements 318, 319 and 426 conduct in a soft switching operation due to the geometrical effect of the ZVT and the loss-less snubber circuits, so that the DC-DC converter works with a high efficiency and a high frequency.

In the second embodiment shown in FIG. 4, the power for ZVT is obtained form the power supply 301, however, it may be possible to arrange such that the power is obtained from the electric charge stored in the capacitor 323 that is provided for storing the surge energy generated when the main switch 318 turns OFF. The electric charge is supplied to the sub switch 426 via the coil c of the transformer 320, and the diode 427. In this case, the inductor 324, which constitutes the first snubber circuit, may be omitted. It may be possible to exchange the position of the diode 322 and the capacitor 323 so as to make the driving operation easier.

Figure 7A:
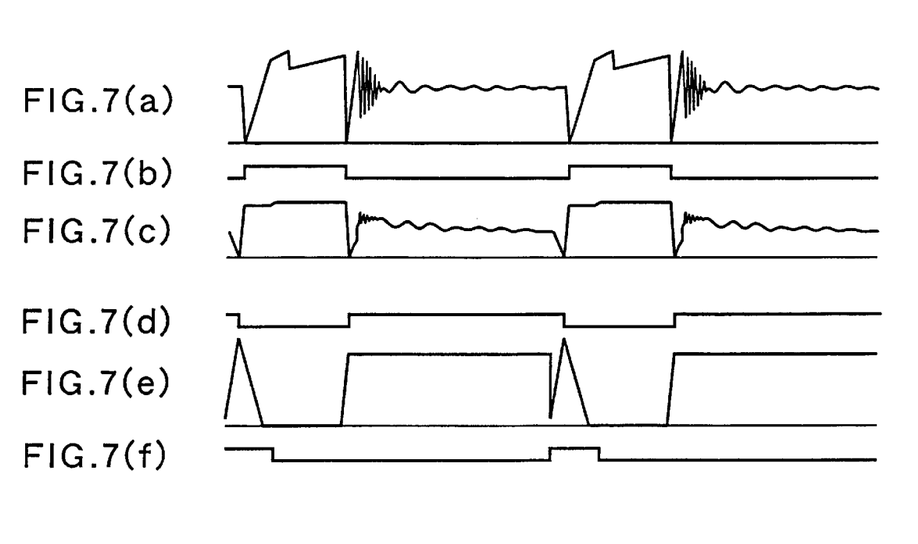

FIGS. 7(a) to 7(f) show waveforms as an example of the Zero Voltage Transition. FIGS. 7(a) and 7(b) are the waveforms showing the operation of the main switch 318; FIG. 7(c) and 7(d) illustrating the operation of the free-wheel switch 319; and FIG. 7(e) and 7(f) depicting the operation of the ZVT switch 426. It should be noted that voltage and current are illustrated in a crossing manner in FIGS. 7(a) to 7(e) in order to clearly show the moment of voltage×current, caused by the soft switching operation. In FIG. 7(a) showing the operation of the main switch 318, the current waveform has a narrower duty ratio, while in FIG. 7(c) illustrating the operation of the free-wheel switch 319, voltage waveform has a narrower duty ratio. Concerning the waveforms of the ZVT switch 426 in FIG. 7(e), the current waveform shows a triangular shape. FIGS. 7(b), 7(d) and 7(e) show waveforms of the driving signals for the switches 318, 319 and 426, respectively.

Figure 5:
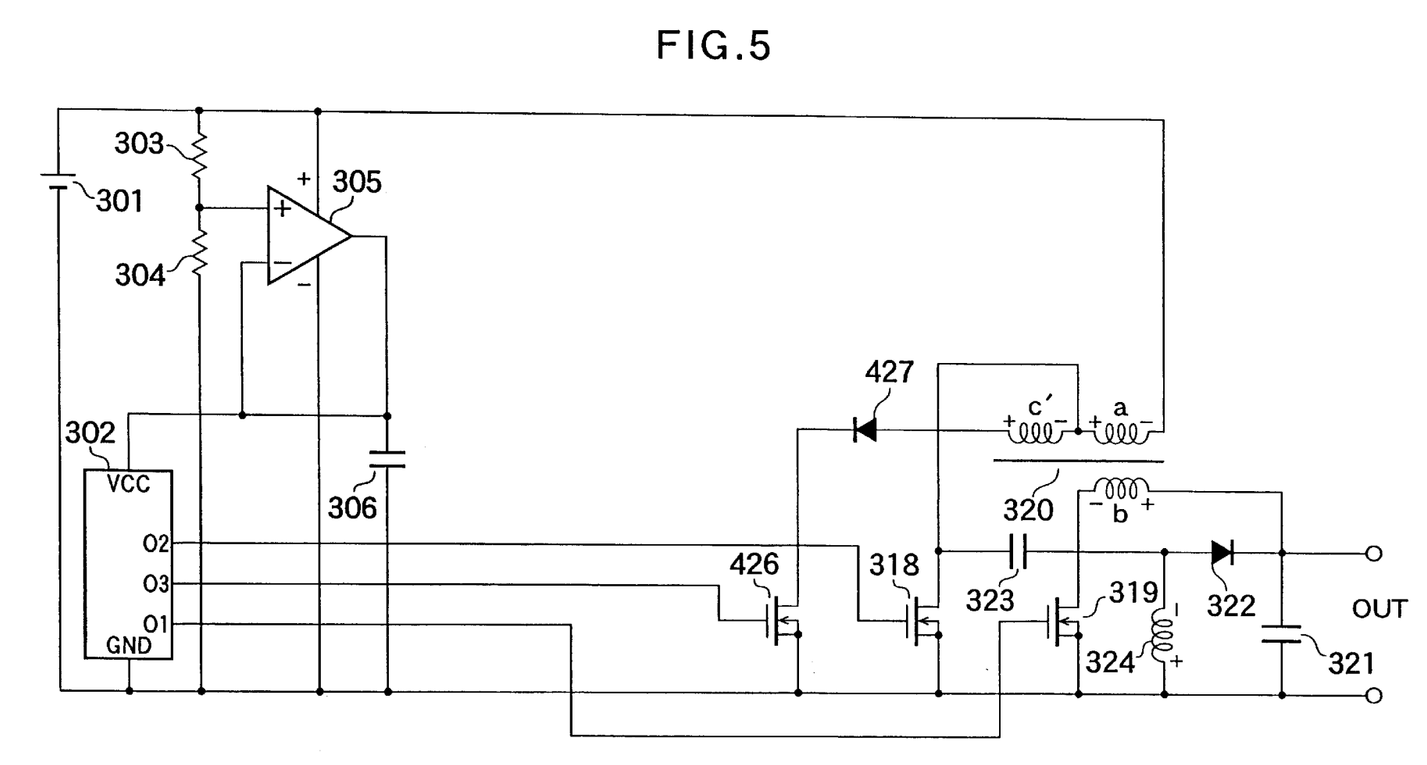
FIG. 5 is a circuit diagram showing a third embodiment according to the present invention.
Figure 11:
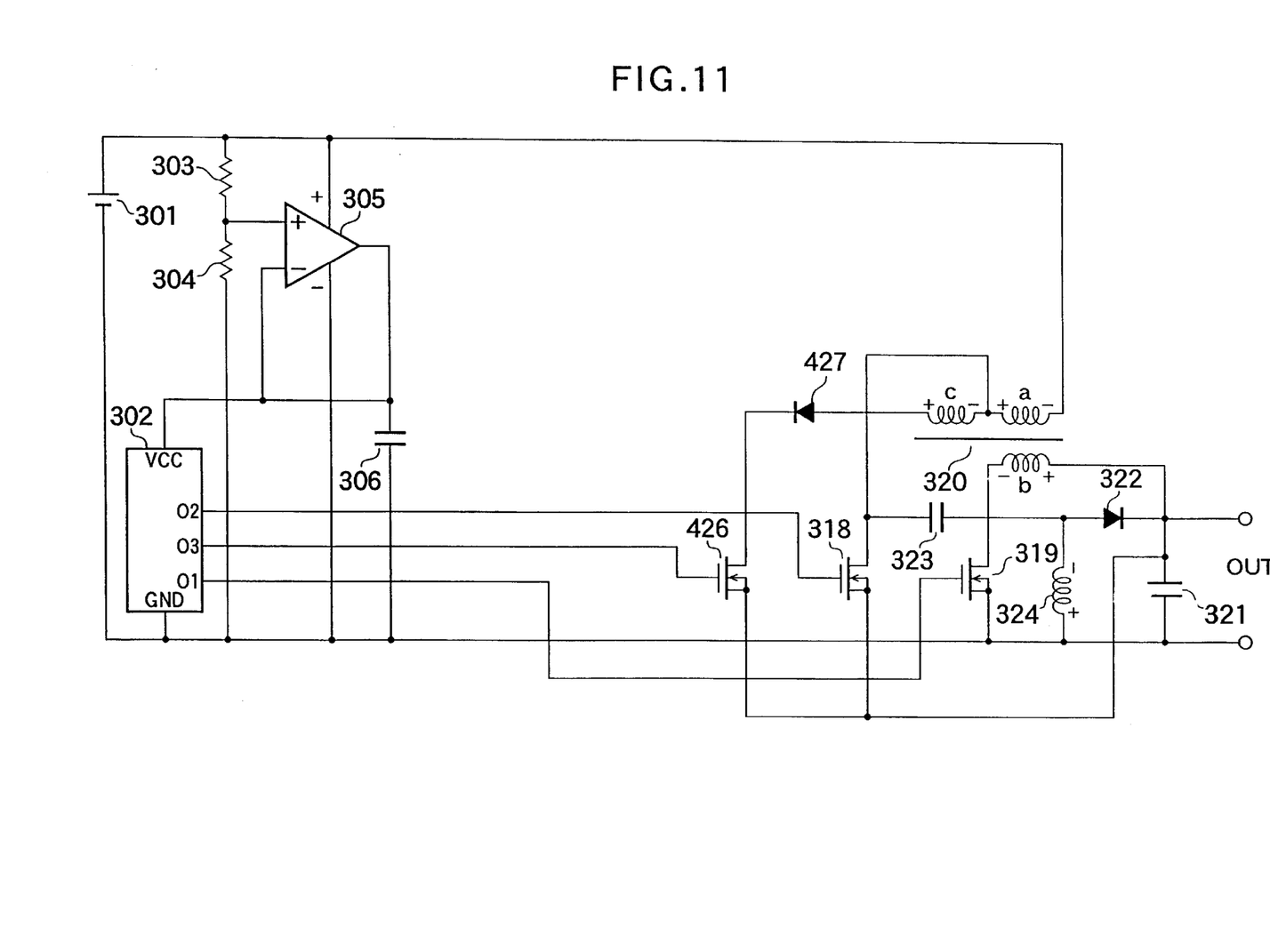
FIG. 11 is a circuit diagram illustrating a fifth embodiment according to the present invention.

FIG. 5 is a circuit diagram showing the third embodiment according to the present invention. If a tap is provided in the inductor of a buck converter, it shows an intermediate operation of a buck converter and a flyback converter. However, if a complete construction of a flyback converter is applied and an intermediate tap is provided in the coil of the transformer 320 provided on the main switch side as shown in FIG. 5, it becomes possible to use an N-channel FET for all switching elements 318, 319 and 426. In addition, the driving circuit for these switching elements becomes very simple, where a pulse transformer or a high side driver is not required. It should be noted that in the circuit shown in FIG. 5 the sources of the switches 318 and 426 may be connected to an upper side of the capacitor 321 to obtain the circuit shown in FIG. 11.

In the third embodiment shown in FIG. 5, the ON/OFF timing of each switch 318, 319, 426 is the same as that of the second embodiment shown in FIG. 4. It should be noted that in the third embodiment shown in FIG. 5 the driving circuits for the switches are included in the control circuit 302. In the third embodiment, a flyback converter having the main switch 318 is simultaneously rectified with the rectifying switch 319, and the sub switch 426, the diode 427 and the coil c' are further added in order to conduct the ZVT operation, and furthermore, the loss-less snubber circuit constituting of the diode 322, the capacitor 323 and the inductor 324 is combined. According to such a construction, all of the switching elements 318, 319 and 426 conduct a soft switching operation. It should be noted that the positions of the diode 322, the inductor 324 constituting of the loss-less snubber circuit are arranged to be opposite to those in the second embodiment, in order to have a preferred operation.

According to the DC-DC converter of the present invention, an intermediate tap is provided in the free-wheel inductor. Therefore, the duty ratio of the main switch can be made so wide that it becomes easy to control the converter and the switching loss can be reduced to make the efficiency higher. Further, by using a P-channel FET (or PNP transistor) as the main switch or by using a pulse transformer and an N-channel FET (or NPN transistor), a simple driving circuit can be realized. Furthermore, by using a loss-less snubber circuit and/or the resonance of the soft switching operation, it can be realized to make the noise lower and the efficiency higher. Therefore, the buck converter according to the present invention is suitably used for a power supply apparatus of for example a lap top type computer, which has a MPU with a low operating voltage and is required to be compact in size.

What is claimed is:

1. A DC-DC buck converter comprising:
    a DC power supply, a main switch coupled to the DC power supply, a free-wheel inductor having first and second coils, one end of each of the coils being connected to a common junction, the other end of the first coil coupled to the main switch, wherein the free-wheel inductor includes an intermediate tap coupling the common junction to a free-wheel switch to provide that, when the free-wheel switch is ON, a free-wheeling current flows through said intermediate tap into the inductor, and wherein said free-wheel switch is an FET.

2. A DC-DC buck converter according to claim 1, wherein a pulse transformer and an N-channel FET or a pulse transformer and an NPN transistor are used for the main switch.

3. A DC-DC buck converter according to claim 1, wherein a P-channel FET or a PNP transistor is used as the main switch.

4. A DC-DC buck converter according to claim 1, wherein a capacitor for resonating is connected to said main switch so as to conduct a soft switching operation.

5. A DC-DC buck converter according to claim 1, wherein said converter further comprises a sub-switch to constitute an active clamp or a sub-switch for zero voltage transition to conduct a soft switching operation.

6. A DC-DC buck converter according to claim 1, further comprising at least one loss-less snubber circuit.

7. A DC-DC voltage step down converter comprising:
    a DC power supply, a main switch, a transformer having first and second primary coils and a third secondary coil, wherein one end of each of the first and second coils is connected to a common junction, an intermediate tap coupling the common junction to a main switch, a rectifying switch coupled to the third coil, a sub-switch for conducting a zero voltage transition operation coupled to the other end of the first coil via a diode, and wherein the rectifying switch is an FET.

8. A DC-DC voltage step down converter according to claim 7, further comprising at least one loss-less snubber circuit.

9. A DC-DC voltage step down converter according to claim 7, wherein one end of said third secondary coil is connected to a smoothing capacitor, wherein said main and sub-switches are FETs and the sources of said main and sub-switches are connected at a third secondary coil side of said smoothing capacitor.

10. A DC-DC buck converter assembly comprising:

a plurality of DC-DC buck converters, wherein each of the converters includes a DC power supply, a main switch coupled to the DC power supply, a free-wheel inductor having first and second coils, one end of each of the coils being connected to a common junction, the other end of the first coil coupled to the main switch, wherein the free-wheel inductor includes an intermediate tap coupling the common junction to a free-wheel switch to provide that, when the free-wheel switch is ON, a free-wheeling current flows through said intermediate tap to the inductor, and wherein said free-wheel switch is an FET;

wherein the converters are connected together in parallel; and a driver switch for switching the converters in a multiple-phased manner.

11. A DC-DC voltage step down converter assembly comprising:

a plurality of DC-DC buck converters, wherein each of the converters includes a DC power supply, a main switch, a transformer having first and second primary coils and a third secondary coil, wherein one end of each of the first and second coils is connected to a common junction, an intermediate tap coupling the common junction to a main switch, a rectifying switch coupled to the third coil, a sub-switch for conducting a zero voltage transition operation coupled to the other end of the first coil via a diode, and wherein the rectifying switch is an FET;

wherein the converters are connected together in parallel; and a driver switch for switching the converters in a multiple-phased manner.

12. A DC-DC buck converter comprising:

a DC power supply, a main switch coupled to the DC power supply, a free-wheel inductor having first and second coils which are arranged in parallel, one end of each of the coils being connected to a common junction, the other end of the first coil coupled to the main switch, and the other end of the second coil being connected to a free-wheel switch to provide that, when the free-wheel switch is ON, a free-wheeling current flows through said second coil into the inductor, and wherein said free-wheel switch is an FET.

* * * * *

UNITED STATES PATENT AND TRADEMARK OFFICE
CERTIFICATE OF CORRECTION

PATENT NO. : 6,429,628 B2  Page 1 of 1
DATED : August 6, 2002
INVENTOR(S) : Shin Nakagawa It is certified that error appears in the above-identified patent and that said Letters Patent is hereby corrected as shown below:

<u>Title page,</u>
Item [30], should read as follows:

-- [30]  Foreign Application Priority Data
Feb. 7, 2000  (JP)  2000-069443
Apr. 10, 2000  (JP)  2000-145736
Dec. 27, 2000  (JP)  2000-404755
Jan. 27, 2001  (JP)  2001-059249 --

Signed and Sealed this

Twenty-eighth Day of January, 2003

JAMES E. ROGAN
*Director of the United States Patent and Trademark Office*